(12) United States Patent
Tzirkel-Hancock et al.

(10) Patent No.: US 9,202,459 B2
(45) Date of Patent: Dec. 1, 2015

(54) METHODS AND SYSTEMS FOR MANAGING DIALOG OF SPEECH SYSTEMS

(71) Applicant: GM GLOBAL TECHNOLOGY OPERATIONS LLC, Detroit, MI (US)

(72) Inventors: Eli Tzirkel-Hancock, Ra'Anana (IL); Gaurav Talwar, Farmington Hills, MI (US); Xufang Zhao, Windsor (CA); Greg T. Lindemann, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 13/866,829

(22) Filed: Apr. 19, 2013

(65) Prior Publication Data

US 2014/0316782 A1   Oct. 23, 2014

(51) Int. Cl.
*G10L 15/06* (2013.01)
*G10L 15/22* (2006.01)
*G10L 15/08* (2006.01)
*H04M 3/493* (2006.01)
*G10L 15/19* (2013.01)

(52) U.S. Cl.
CPC .............. *G10L 15/06* (2013.01); *G10L 15/08* (2013.01); *G10L 15/22* (2013.01); *G10L 15/19* (2013.01); *G10L 2015/086* (2013.01); *G10L 2015/221* (2013.01); *H04M 3/493* (2013.01); *H04M 2201/40* (2013.01)

(58) Field of Classification Search
CPC ................................................ G10L 2015/086
USPC ................................................ 704/251–252
See application file for complete search history.

(56) References Cited

U.S. PATENT DOCUMENTS

| 5,903,864 | A | 5/1999 | Gadbois et al. |
| 5,987,411 | A * | 11/1999 | Petroni et al. .................. 704/255 |
| 6,487,532 | B1 * | 11/2002 | Schoofs et al. ............... 704/251 |
| 7,502,742 | B2 * | 3/2009 | Knott et al. .................... 704/275 |
| 7,526,431 | B2 | 4/2009 | Roth et al. |
| 7,844,456 | B2 * | 11/2010 | Cai et al. ........................ 704/243 |
| 7,904,298 | B2 | 3/2011 | Rao |
| 8,099,287 | B2 * | 1/2012 | Bodin et al. ................... 704/275 |
| 8,433,570 | B2 * | 4/2013 | Arun .............................. 704/243 |
| 2006/0004572 | A1 * | 1/2006 | Ju et al. ......................... 704/243 |
| 2006/0106614 | A1 * | 5/2006 | Mowatt et al. ................ 704/275 |
| 2007/0043562 | A1 * | 2/2007 | Holsinger et al. ............. 704/231 |
| 2008/0243504 | A1 * | 10/2008 | Poi ................................. 704/247 |
| 2009/0216525 | A1 * | 8/2009 | Shostak ............................. 704/9 |
| 2009/0271189 | A1 * | 10/2009 | Agapi et al. ................... 704/233 |
| 2011/0153322 | A1 * | 6/2011 | Kwak et al. ................... 704/235 |
| 2012/0035924 | A1 * | 2/2012 | Jitkoff et al. .................. 704/235 |
| 2012/0095765 | A1 * | 4/2012 | Bodin et al. ................... 704/251 |
| 2013/0185066 | A1 * | 7/2013 | Tzirkel-Hancock et al. . 704/233 |

FOREIGN PATENT DOCUMENTS

WO      2005098817  A2    10/2005

* cited by examiner

*Primary Examiner* — Douglas Godbold
(74) *Attorney, Agent, or Firm* — Ingrassia Fisher & Lorenz, P.C.

(57) ABSTRACT

Methods and systems are provided for managing speech dialog of a speech system. In one embodiment, a method includes: receiving a first utterance from a user of the speech system; determining a first list of possible results from the first utterance, wherein the first list includes at least two elements that each represent a possible result; analyzing the at least two elements of the first list to determine an ambiguity of the elements; and generating a speech prompt to the user based on partial orthography and the ambiguity.

20 Claims, 4 Drawing Sheets

METHODS AND SYSTEMS FOR MANAGING DIALOG OF SPEECH SYSTEMS

TECHNICAL FIELD

The technical field generally relates to speech systems, and more particularly relates to methods and systems for managing dialog within a speech system using partial orthography.

BACKGROUND

Vehicle speech recognition systems perform speech recognition or understanding of speech uttered by occupants of the vehicle. The speech utterances typically include commands that communicate with or control one or more features of the vehicle or other systems that are accessible by the vehicle. A speech dialog system generates spoken commands in response to the speech utterances. In some instances, the spoken commands are generated in response to the speech recognition needing further information in order to perform the speech recognition. For example, a spoken command may ask the user to repeat the speech utterance or may ask the user to select from a list of possibilities. Such spoken commands may be clumsy, difficult to follow, or may fail to resolve the recognition issue.

Accordingly, it is desirable to provide improved methods and systems for managing a speech dialog to improve the speech recognition. Accordingly, it is further desirable to provide methods and systems for managing a speech dialog using partial orthography to improve speech recognition. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for managing speech dialog of a speech system. In one embodiment, a method includes: receiving a first utterance from a user of the speech system; determining a first list of possible results from the first utterance, wherein the first list includes at least two elements that each represent a possible result; analyzing the at least two elements of the first list to determine an ambiguity of the elements; and generating a speech prompt to the user based on partial orthography and the ambiguity.

In another embodiment, a system includes a first module that receives a first utterance from a user of the speech system, and that determines a first list of possible results from the first utterance. The first list includes at least two elements that each represents a possible result. A second module analyzes the at least two elements of the first list to determine an ambiguity of the elements. A third module generates a speech prompt to the user based on partial orthography and the ambiguity.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
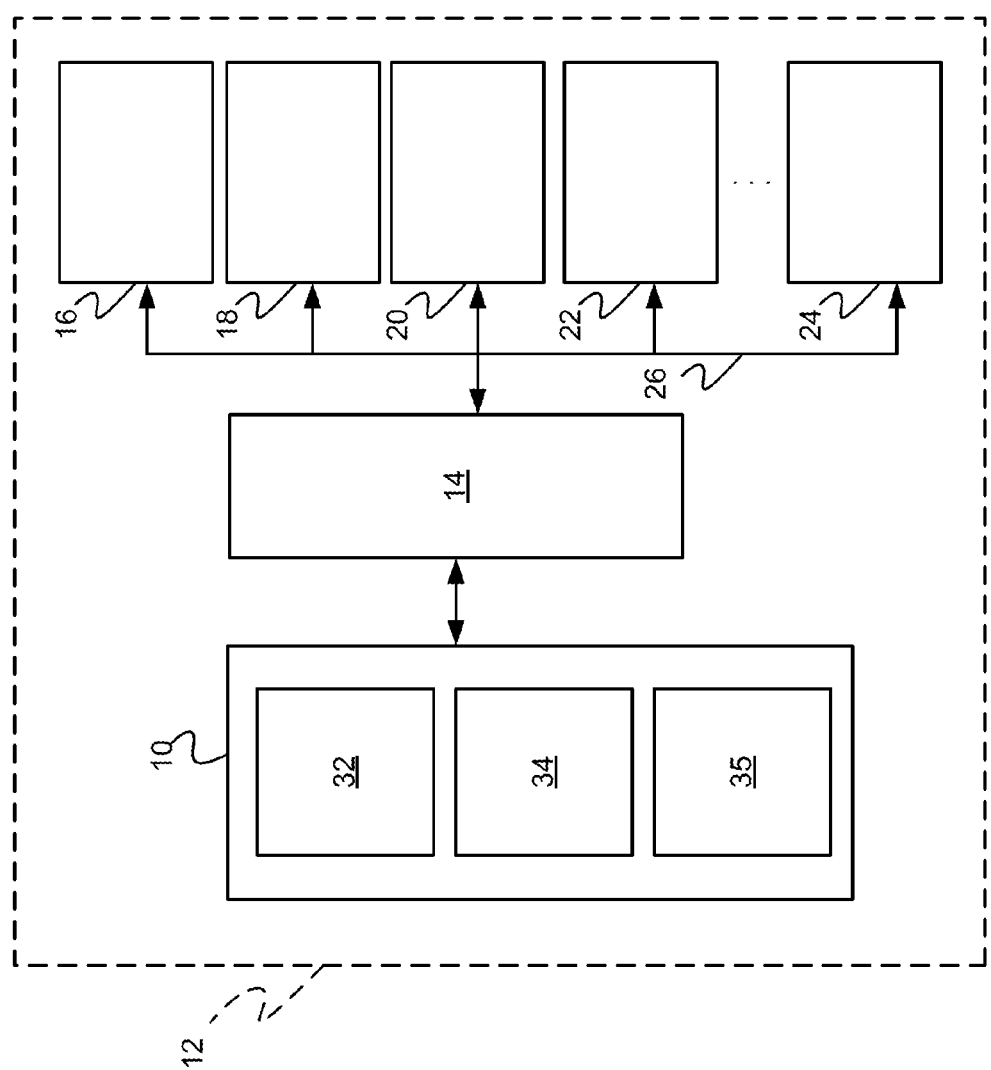
FIG. 1 is a functional block diagram of a vehicle that includes a speech system in accordance with various exemplary embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

In accordance with exemplary embodiments of the present disclosure a speech system 10 is shown to be included within a vehicle 12. In various exemplary embodiments, the speech system 10 provides speech recognition or understanding and a dialog for one or more vehicle systems through a human machine interface module (HMI) module 14. Such vehicle systems may include, for example, but are not limited to, a phone system 16, a navigation system 18, a media system 20, a telematics system 22, a network system 24, or any other vehicle system that may include a speech dependent application. As can be appreciated, one or more embodiments of the speech system 10 can be applicable to other non-vehicle systems having speech dependent applications and thus, is not limited to the present vehicle example.

The speech system 10 communicates with the multiple vehicle systems 14-24 through a communication bus and/or other communication means 26 (e.g., wired, short range wireless, or long range wireless). The communication bus can be, for example, but is not limited to, a controller area network (CAN) bus, local interconnect network (LIN) bus, or any other type of bus.

The speech system 10 includes a speech understanding module 32, a dialog manager module 34, and a speech generation module 35. As can be appreciated, the speech understanding module 32, the dialog manager module 34, and the speech generation module 35 may be implemented as separate systems and/or as a combined system as shown. In general, the speech understanding module 32 receives and processes speech utterances from the HMI module 14 using one or more speech recognition techniques. The speech understanding module 32 generates one or more lists of possible results from the speech utterance (e.g., based on a confidence threshold) and sends the list(s) to the dialog manager module 34. In various embodiments, the speech understanding module 32 generates the list using predefined possibilities stored in a datastore. For example, the predefined possibilities can be names or numbers stored in a phone book, names or addresses stored in and address book, song names or artists stored in a music directory, etc.

The dialog manager module 34 manages an interaction sequence and a selection of speech prompts to be spoken to the user based on the list(s). In particular, when a list contains more than one possible result, the dialog manager module 34 uses disambiguation strategies to manage a dialog of prompts with the user such that a recognized result can be determined. The disambiguation strategies help to recognize a user goal rather than recognize the exact words the user is saying. The speech generation module 35 generates the spoken prompts to the user based on the dialog determined by the dialog manager 34.

Figure 2:
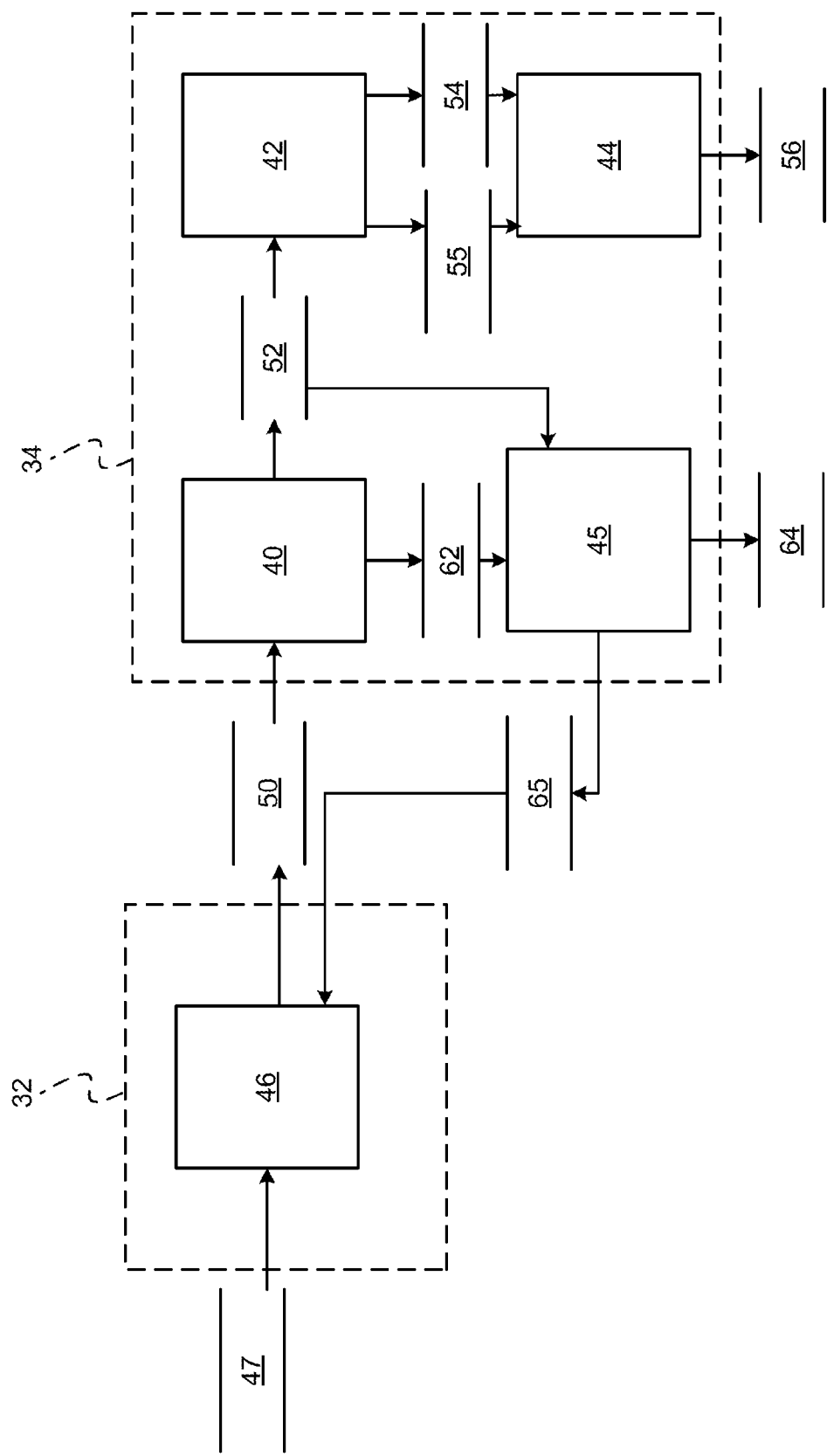
FIG. 2 is a dataflow diagram illustrating a speech system in accordance with various exemplary embodiments.

Referring now to FIG. 2, a dataflow diagram illustrates the speech understanding module 32 and the dialog manager module 34 in accordance with various exemplary embodiments. As can be appreciated, various exemplary embodiments of the speech understanding module 32 and the dialog manager module 34, according to the present disclosure, may include any number of sub-modules. In various exemplary embodiments, the sub-modules shown in FIG. 2 may be combined and/or further partitioned to similarly manage the dialog using disambiguation strategies. In various exemplary embodiments, the dialog manager module 34 includes a list analyzer module 40, an ambiguity identifier module 42, a prompt manager module 44 and a result determination module 45. The speech understanding module 32 includes a recognizer module 46.

With reference to the speech understanding module 32, the recognizer module 46 receives as input a speech utterance 47 from the user (e.g., through the HMI module 14 (FIG. 1). The recognizer module 46 processes the speech utterance 47 using one or more speech models to determine a list 50 of possible results. The list 50 includes one or more elements that represent a possible result of the processing. In various embodiments, each element of the list includes one or more slots that are each associated with a slot type depending on the application. For example, if the application supports making phone calls to phonebook contacts (e.g., "Call John Doe"), then each element may include slots with slot types of a first name, a middle name, and/or a last name. In another example, if the application supports navigation (e.g., "Go to 1111 Sunshine Boulevard"), then each element may include slots with slot types of a house number, and a street name, etc. In various embodiments, the slots and the slot types may be stored in a datastore and accessed by the recognizer module 46. Each element or slot of the list 50 is associated with a confidence score that is determined as a result of the processing.

With reference now to the dialog manager module 34, the list evaluator module 40 receives as input the list 50 from the speech understanding module 32. The list evaluator module 40 evaluates the list 50 to determine whether disambiguation is needed. For example, when the list 50 contains more than one element, the list analyzer module 40 selects that list for further processing by the ambiguity identifier module 42, referred to as the selected list 52. When the list 50 only contains one element or is received in response to a speech prompt 56 (as will be discussed), the list evaluator module 40 provides the list as an updated list 62 to the result determination module 45. As can be appreciated, in various embodiments, when the list 50 only contains one element and an associated confidence score is low, the list 50 could be selected for further processing. However, for exemplary purposes, the disclosure will be discussed in the context of the selected list 52 containing more than one element.

The ambiguity identifier module 42 receives as input the selected list 52. The ambiguity identifier module 42 processes the elements of the selected list 52 to identify ambiguities between the elements. The ambiguity identifier module 42 generates an ambiguity type 54 based on the ambiguities between the elements. For example, the ambiguity type can be based on the slot types (e.g., first name, last name, street name, street number, etc.) of the ambiguous elements.

The ambiguity identifier module 42 identifies ambiguities between the elements by identifying ambiguities between slots of the elements having a particular slot type. For example, the ambiguity identifier module 42 processes the first slot of the elements to identify any ambiguities, then processes the second slot of the elements to identify any ambiguities, and so on, for the number of slots in the element.

In various embodiments, the ambiguity identifier module 42 identifies ambiguities between a top number M of elements in the selected list 52, where M is an integer greater than two. For example, the ambiguity identifier module 42 processes the slots of a top two elements of the selected list 52 to identify ambiguities, where the elements are ranked as the top two based on the associated confidence score(s).

The ambiguity identifier module 42 further identifies ambiguities between the elements by determining differences between the slots of the particular slot type. In various embodiments, the ambiguity identifier module 42 determines the differences based on an orthography of the slots. For example, the orthography of the slot can be according to a language associated with the slot, either spoken or written. The ambiguity identifier module 42 evaluates one or more aspects of the orthography to determine the difference (e.g., letters, digits, characters, phonemes, tones, etc.). When the ambiguity identifier module 42 identifies the ambiguities based on the orthography of the slots, a difference type 55 is generated that identifies the aspect of the orthography (e.g., letters, digits, characters, phonemes, tones, etc.) that identified the difference.

For example, the ambiguity identifier module 42 compares the first slots of the elements (e.g., of the top M elements) to determine orthographic differences between each of the first slots, compares the second slots of the elements to determine orthographic differences between each of the second slots, and so on, for all of the slots in the elements. The slots of the elements having the greatest orthographic difference are identified as the ambiguous slots. The slot type associated with the ambiguous slots is selected as the ambiguity type 54. The aspect of the orthography that identified the greatest difference is selected as the difference type 55.

In various embodiments, the ambiguity identifier module 42 determines the ambiguities between the elements by determining a difference in the confidence score associated with the slots or elements. For example, the ambiguity identifier module 42 compares the confidence scores of the first slots of the elements (e.g., of the top M elements) to determine confidence differences, compares the confidence scores of the second slots of the elements to determine confidence differences, and so on, for all of the slots in the elements. The slots of the elements having the smallest confidence difference are identified as the ambiguous slots and the slot type associated with the ambiguous slots is selected as the ambiguity type 54. When the ambiguity identifier module 42 identifies the ambiguities based on the confidence level associated with the slots, the difference type 55 is set to a predetermined value, for example, based on the orthography associated with the slots.

In still other embodiments, the ambiguity identifier module 42 identifies the ambiguities between the elements based on the confidence scores and the orthography of the slots. For example, the ambiguity identifier module 42 compares the confidence scores of the first slots of the elements (e.g., of the top M elements) to determine confidence differences, compares the confidence scores of the second slots of the elements to determine confidence differences, and so on for all of the slots in the elements. The slots of the elements having the smallest confidence difference are identified as the ambiguous slots and the slot type associated with the ambiguous slots is selected as the ambiguity type 54. The ambiguity identifier module 42 then determines an orthographic difference between the slots associated with the smallest confidence difference and sets the difference type 55 based on the orthographic difference. As can be appreciated, the ambiguity identifier module 42 can use both the confidence score and the orthography of the slots in other ways and thus, is not limited to the present example.

The prompt manager module 44 receives as input the ambiguity type 54 and the difference type 55. The prompt manager module 44 generates a speech prompt 56 based on the selected ambiguity type 54 and the difference type 55. In various embodiments, the speech prompt 56 is generated based on partial orthography. For example, the speech prompt 56 asks the user to spell/say X number of the difference type 55 of the ambiguity type 54. For example, if the ambiguity type 54 identified is the last name and the difference type 55 identified is letters, the prompt manager module 44 generates a speech prompt including "Please spell the first three letters of the last name," "Please spell the last four letters of the last name," "Please spell a few letters of the last name," etc. In another example, if the ambiguity type 54 is street number and the difference type 55 is digits, the prompt manager module 44 generates a speech prompt including "Please say the first three digits of the street number," "Please say the last three digits of the street number," "Please say a few digits of the street number," etc. As can be appreciated, the number X can be predefined or can be determined based on the determined orthographic differences between the slots.

The result determination module 45 receives as input the updated list 62 and/or the selected list 52. The result determination module 45 determines a result 64 based on the selected list 52 and/or the updated list 62. In various embodiments, the result determination module 45 determines the result 64 by fusing the selected list 52 with the updated list 62. For example, the result determination module 45 fuses (or combines) the elements and the confidence scores of the elements of the selected list 52 and the updated list 62 to generate a fused list. For example, if the selected list 52 contains an element that is the same as an element of the updated list 62, then the confidence score(s) for that element are combined (e.g., by addition or some other computation) and that element is added to the fused list with the combined confidence score. The confidence scores of the fused list are then evaluated to determine the result 64.

In various other embodiments, the result determination module 45 uses the updated list 62 to update a grammar 65 of the speech model used to perform speech recognition or understanding of the initial speech utterance and/or future speech utterances. For example, the result 64 can be determined from the speech recognition of the initial speech utterance using the updated grammar.

Figure 3:
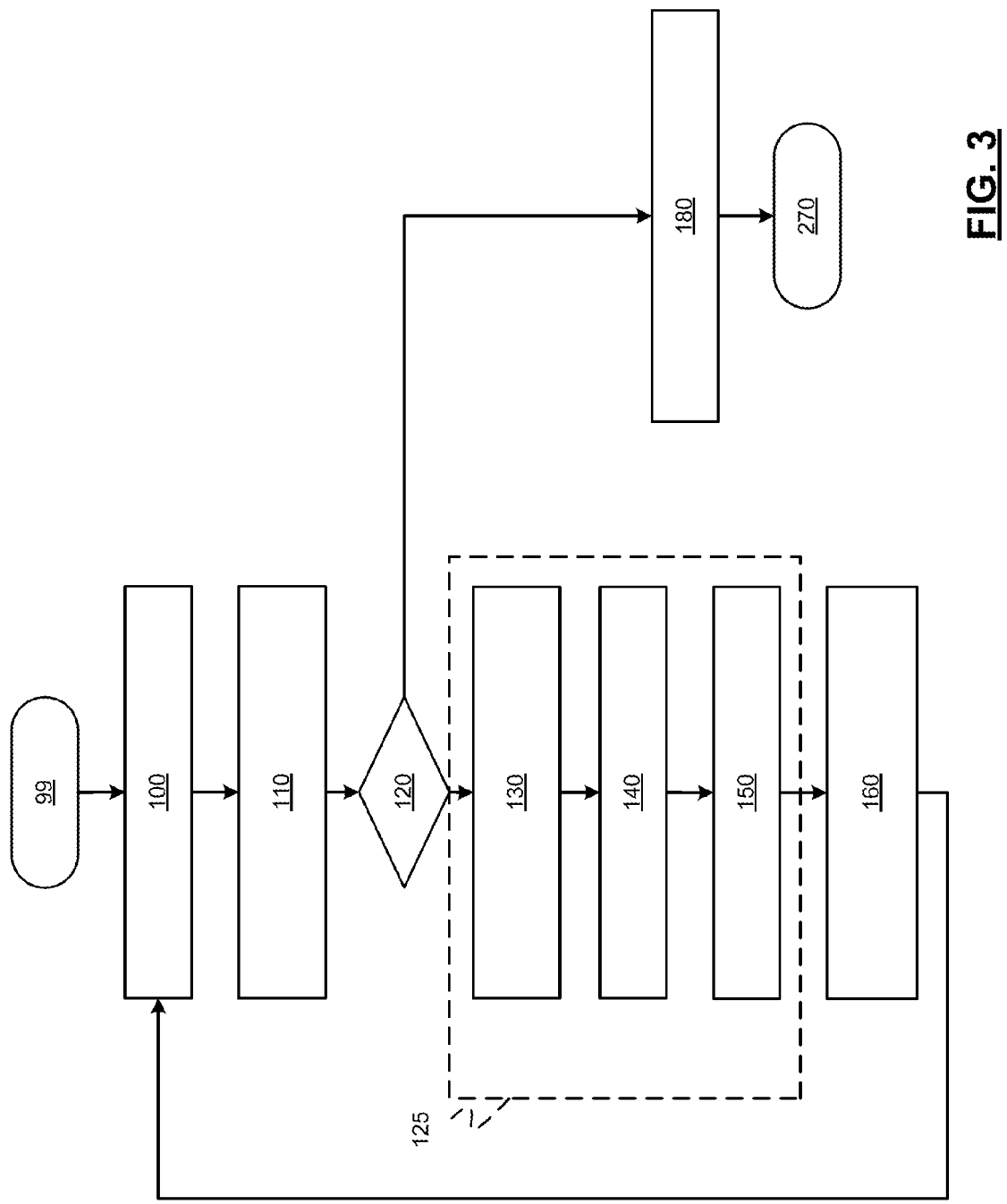
FIGS. 3-5 are flowcharts illustrating speech methods that may be performed by the speech system in accordance with various exemplary embodiments.
Figure 5:
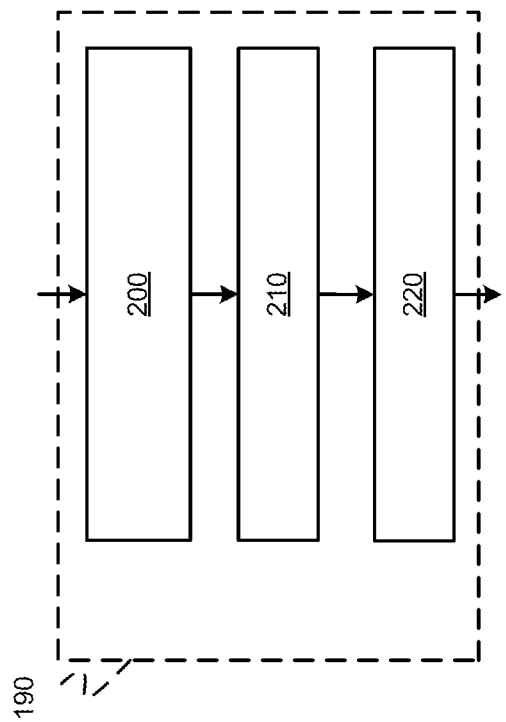
Figure 4:
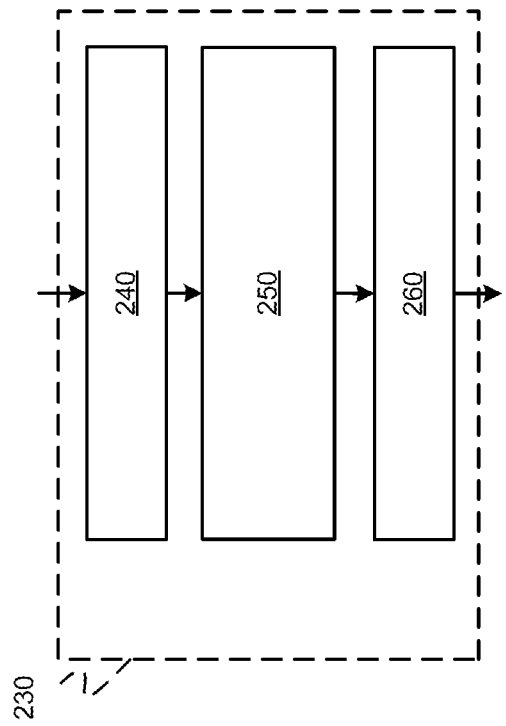

Referring now to FIGS. 3-5, flowcharts illustrate speech methods that may be performed by the speech system 10 in accordance with various exemplary embodiments. As can be appreciated in light of the disclosure, the order of operation within the methods is not limited to the sequential execution as illustrated in FIGS. 3-5, but may be performed in one or more varying orders as applicable and in accordance with the present disclosure. As can further be appreciated, one or more steps of the method may be added or removed without altering the spirit of the method.

As shown, the method may begin at 99. The speech utterance 47 is received at 100. One or more speech recognition methods are performed on the speech utterance 47 to determine the list 50 of results at 110. For example, if the speech utterance is "call Scott Rothestein," the name may not be directly recognized and the list 50 of possible results for "Scott Rothestein" is generated (e.g., from listed names in an address book). In one example, the top three elements of the list 50 includes "Scott Austin," "Scott Rothstein," and "Tom Rothman." As can be appreciated, the method will be discussed in the context of this example, but is not so limited.

Since the list 50 contains more than one element, the list 50 is selected as the selected list 52 for further processing at 120. The ambiguities of the list are determined at 125. For example, the differences are determined at 130. Provided the exemplary list above, the slots are based on the first word and the second word and the slot types are first name and second name. The differences for the slots of the first name are determined based on an orthographic difference and/or confidence difference between slots associated with the first name; and the differences for the slots of the last name are determined based on an orthographic difference and/or confidence difference of the slots associated with the last name. For example, orthographic differences for the first name are determined between "Scott" and "Scott," and "Scott" and "Tom;" and orthographic differences for the last name are determined between "Austin" and "Rothstein," "Rothstein" and "Rothman," and "Rothman" and "Austin."

Thereafter, the ambiguity type 54 is set to the slot type of the slots with the greatest difference at 140, and the difference type 55 is set to the aspect of orthography that has the greatest difference at 150. In the example provided, the last name is the slot type having the greatest difference, and the last syllable of the last name is aspect of orthography that has the greatest difference. At 160, the speech prompt 56 is generated based on the ambiguity type 54 and the difference type 55. For example the speech prompt 56 may include "Please spell the last few letters of the last name."

Thereafter, the method continues with receiving a second speech utterance 47 at 100. One or more speech recognition methods are performed on the second speech utterance 47 to determine a second list 50 of results at 110. Since the list is received in response to the speech prompt 56, the list 50 is set to the updated list 62 at 120 and not processed for further ambiguities. The result 64 is generated based on the selected list 52 and/or the updated list 62 using either a fusing of the lists 52, 62 or updating a grammar based on the update list 62 as described above at 180. For example, as shown in FIG. 4, the result 64 is generated by the fusing of the lists 52, 62 at 190 by combining the elements and the confidence scores of the lists 52, 62 into a single fused list at 200, sorting the fused list based on the confidence scores at 210, and selecting the top element of the sorted, fused list as the result 64 at 220.

In another example, as shown in FIG. 5, the result 64 is generated based on an updated grammar that is determined from the updated list 62 at 230 by generating an updated grammar using the updated list 62 at 240, performing speech recognition on the first speech utterance 47 using the updated grammar to generate an updated list at 250, and selecting a top element (or top confidence score) of the updated list as the result 64 at 260.

With reference back to FIG. 3, after the result 64 is determined at 180, the method may end at 270.

As can be appreciated, the method may iterate for any number of speech utterances 47, as the criteria at 120 can be based on the number of elements in the list, can be based on a number of responses to speech prompts 56, or any other criteria. As can further be appreciated, other methods may be performed to determine a result if an ambiguity in the elements still exists after the processing of at least two speech utterances.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for managing speech dialog of a speech system, comprising:
   receiving a first utterance from a user of the speech system;
   determining a first list of possible results from the first utterance, wherein the first list includes at least two elements that each represent a possible result;
   analyzing an orthography of the at least two elements of the first list to determine an ambiguity of the elements; and
   generating a speech prompt to the user that dynamically requests a partial orthography of the first utterance based on the ambiguity.

2. The method of claim 1, further comprising:
   receiving a second utterance from a user in response to the speech prompt;
   determining a second list of possible results from the second utterance; and
   generating a result based on the first list and the second list.

3. The method of claim 2, wherein the generating the result is based on a fusing of the possible results of the first list and the possible results of the second list.

4. The method of claim 2, further comprising:
   updating a grammar of a speech model based on the second list; and
   using the updated grammar of the speech model to generate the result.

5. The method of claim 1, wherein the analyzing comprises analyzing the at least two elements of the first list to determine differences between the at least two elements.

6. The method of claim 5, wherein the analyzing further comprises determining differences between slots of a first element and slots of a second element of the first list to determine the differences.

7. The method of claim 6, wherein the determining differences comprises determining orthographic differences between the slots of the first element and the slots of the second element.

8. The method of claim 7, wherein the orthographic differences are based on a language associated with the slot.

9. The method of claim 7, wherein the orthographic differences are based on at least one of letters, digits, characters, phonemes, and tones of the slots.

10. The method of claim 6, wherein the determining the differences comprises determining confidence differences between the slots of the first element and the slots of the second element.

11. The method of claim 10, wherein the determining the differences further comprises determining orthographic differences between the slots of the first element and the slots of the second element.

12. The method of claim 6, wherein the analyzing further comprises selecting a greatest difference from the differences, and setting an ambiguity type to a slot type associated with the slots that are associated with the greatest difference, and wherein the generating the speech prompt to the user is based on the ambiguity type.

13. The method of claim 1, wherein the partial orthography is based on a determined orthographic difference type.

14. The method of claim 1, wherein the partial orthography is based on a determined ambiguity type.

15. The method of claim 1, further comprising:
   determining an ambiguity type based on the ambiguity;
   determining a difference type based on the ambiguity; and
   wherein the generating the speech prompt is based on the ambiguity type and the difference type.

16. The method of claim 1, wherein the receiving the first utterance is through a human machine interface module of a vehicle.

17. A speech system for managing speech dialog, comprising:
   a first module that receives a first utterance from a user of the speech system, and that determines a first list of possible results from the first utterance, wherein the first list includes at least two elements that each represent a possible result;
   a second module that analyzes an orthography of the at least two elements of the first list to determine an ambiguity of the elements; and
   a third module that generates a speech prompt to the user that dynamically requests a partial orthography of the first utterance based on the ambiguity.

18. The speech system of claim 17, wherein the first module receives a second utterance from a user in response to the speech prompt, wherein the second module determines a second list of possible results from the second utterance, and wherein a fourth module generates a result based on the first list and the second list.

19. The speech system of claim 18, wherein the fourth module generates the result based on a comparison of the possible results of the first list and the possible results of the second list.

20. The speech system of claim 18, wherein the fourth module updates a grammar of a speech model based on the second list; and uses the updated grammar of the speech model to generate the result.

* * * * *